United States Patent
Neubauer

(10) Patent No.: US 10,954,863 B2
(45) Date of Patent: Mar. 23, 2021

(54) PHASING GEARBOX

(71) Applicant: General Electric Company, Schenectady, NY (US)

(72) Inventor: Mark Edward Neubauer, Lebanon, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 98 days.

(21) Appl. No.: 16/379,056

(22) Filed: Apr. 9, 2019

(65) Prior Publication Data

US 2020/0325826 A1 Oct. 15, 2020

(51) Int. Cl.
| | |
|---|---|
| F02C 7/32 | (2006.01) |
| F01D 25/08 | (2006.01) |
| F16H 57/02 | (2012.01) |
| F01D 25/12 | (2006.01) |
| F16H 57/031 | (2012.01) |
| F02K 3/06 | (2006.01) |

(52) U.S. Cl.
CPC ............... *F02C 7/32* (2013.01); *F01D 25/12* (2013.01); *F16H 57/031* (2013.01); *F02K 3/06* (2013.01); *F05D 2260/232* (2013.01); *F05D 2260/4031* (2013.01)

(58) Field of Classification Search
CPC .......... F16H 1/20; F16H 1/206; F16H 57/031; F16H 2057/02013; F16H 2057/02039; F16H 2057/0335; F02C 7/32; F01D 25/12; F02K 3/06; F05D 2260/232; F05D 2260/4031

See application file for complete search history.

(56) References Cited

U.S. PATENT DOCUMENTS

| | | | |
|---|---|---|---|
| 2,970,442 A | 2/1961 | Taylor | |
| 8,360,931 B2 | 1/2013 | Keeney et al. | |
| 8,601,868 B2 * | 12/2013 | Hastings | F16H 57/0449 |
| | | | 73/323 |
| 8,966,875 B2 * | 3/2015 | Suciu | F02C 7/32 |
| | | | 60/39.08 |
| 9,404,425 B2 | 8/2016 | Martin | |
| 9,458,770 B2 | 10/2016 | Anghel et al. | |
| 10,059,460 B2 | 8/2018 | Dauriac et al. | |
| 10,087,761 B2 * | 10/2018 | Calvert | F01D 5/027 |
| 10,352,250 B2 * | 7/2019 | Guillemont | H02K 49/00 |
| 10,450,959 B2 * | 10/2019 | Morreale | F02C 7/36 |
| 2011/0109305 A1 * | 5/2011 | Galivel | F01D 21/003 |
| | | | 324/207.25 |

(Continued)

*Primary Examiner* — Adam D Rogers
(74) *Attorney, Agent, or Firm* — Hanley, Flight & Zimmerman, LLC

(57) ABSTRACT

A gas turbine engine includes a compressor, a turbine, and an engine shaft coupled to the compressor and the turbine; a gear assembly including a driveshaft and an accessory gearbox, the driveshaft rotatable by the engine shaft and the accessory gearbox rotatable by the driveshaft, the accessory gearbox including an AGB output, and the gear assembly defining a first overall gear ratio between the engine shaft and the AGB output; and a phasing gearbox coupled to the accessory gearbox and including a PGB output, and the phasing gearbox defining a second overall gear ratio between the AGB output of the accessory gearbox and the PGB output, wherein the second overall gear ratio is an inverse of the first overall gear ratio.

20 Claims, 4 Drawing Sheets

(56) References Cited

U.S. PATENT DOCUMENTS

2013/0283899 A1 10/2013 Plowman
2014/0326060 A1 11/2014 Mancarella et al.
2017/0167287 A1 6/2017 Jacobs et al.
2017/0248081 A1 8/2017 Roach et al.

\* cited by examiner

PHASING GEARBOX

FIELD

The present subject matter relates generally to a phasing gearbox and a gas turbine engine including the same.

BACKGROUND

When manufacturing gas turbine engines, the spool(s) of the engines generally must be balanced to ensure they are within design specification limits. This may be accomplished generally by rotating the spools at high speeds via engine operation, for a moderate period of time, and measuring rotational information, such as rotational speed, imbalance and location (phase) of the imbalance using properly placed accelerometers. Computer algorithms may then be used to determine if the spool is properly balanced, and if not, the location and magnitude of weight that is needed to bring it to proper balance is calculated and applied.

Measuring this rotational information may be done by using an optical indicator positioned within the engine to scan a timing mark on the spool being balanced. Such generally requires positioning the optical indicator within the core with a line of sight access to the spool. With at least certain gas turbine engines, such may require a relatively involved process of removing panels and other components of the gas turbine engine to provide such line of sight access for the optical indicator. For example, with at least certain engines, this process may take as much as ten to fifteen man-hours. Further, optical devices generally do not provide a "clean, sharp" output signal that is beneficial to precise balancing.

Accordingly, the inventor of the present disclosure has discovered that a method for determining a position of one or more shafts of the engine without requiring the same degree of disassembly would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a compressor, a turbine, and an engine shaft coupled to the compressor and the turbine; a gear assembly including a driveshaft and an accessory gearbox, the driveshaft rotatable by the engine shaft and the accessory gearbox rotatable by the driveshaft, the accessory gearbox including an AGB output, and the gear assembly defining a first overall gear ratio between the engine shaft and the AGB output; and a phasing gearbox coupled to the accessory gearbox and including a PGB output, and the phasing gearbox defining a second overall gear ratio between the AGB output of the accessory gearbox and the PGB output, wherein the second overall gear ratio is an inverse of the first overall gear ratio.

In certain exemplary embodiments the first overall gear ratio is an irrational number, and wherein the second overall gear ratio is an exact inverse of the first overall gear ratio.

In certain exemplary embodiments the gear assembly includes a plurality of GA gear sets, wherein the phasing gearbox includes a plurality of PGB gear sets, and wherein each PGB gear set defines a PGB gear ratio that is an inverse of a GA gear ratio of one GA gear set of the plurality of GA gear sets of the gear assembly.

In certain exemplary embodiments the gear assembly includes a first GA gear set and a second GA gear set, wherein the phasing gearbox includes a first PGB gear set and a second PGB gear set, wherein the first PGB gear set defines a first PGB gear ratio that is an inverse of a first GA gear ratio of the first GA gear set, and wherein the second PGB gear set defines a second PGB gear ratio that is an inverse of a second GA gear ratio of the second GA gear set.

In certain exemplary embodiments the accessory gearbox includes an internal spool, wherein the gear assembly includes a first GA gear set mating the driveshaft to the engine shaft, a second GA gear set mating the driveshaft to the internal spool, and a third GA gear set mating the internal spool to the AGB output.

For example, in certain exemplary embodiments the phasing gearbox includes a first PGB gear set, a second PGB gear set, and a third PGB gear set, wherein the first PGB gear set defines a first PGB gear ratio that is an inverse of a first GA gear ratio of the first GA gear set, wherein the second PGB gear set defines a second PGB gear ratio that is an inverse of a second GA gear ratio of the second GA gear set, and wherein the third PGB gear set defines a third PGB gear ratio that is an inverse of a third GA gear ratio of the third GA gear set.

In certain exemplary embodiments the PGB output of the phasing gearbox includes a PGB output shaft and a circular member including a plurality of position indicators spaced circumferentially on the circular member.

In certain exemplary embodiments the phasing gearbox includes a casing and an end cover panel, and wherein the end cover panel defines an opening for viewing the PGB output.

In certain exemplary embodiments the phasing gearbox includes a casing and an end cover panel, and wherein the end cover panel includes an inclinometer.

In certain exemplary embodiments the phasing gearbox includes a casing and an end cover panel, and wherein the end cover panel includes an airflow screen for allowing a flow of cooling air therethrough.

For example, in certain exemplary embodiments the PGB output of the phasing gearbox includes a PGB output shaft and a circular member, the circular member including a plurality of blades spaced circumferentially on the circular member for inducing the flow of cooling air through the airflow screen of the end cover panel during operation.

In certain exemplary embodiments the compressor and the turbine define in part a core air flowpath, and wherein the accessory gearbox is located outward of the core air flowpath.

In another exemplary embodiment of the present disclosure, a phasing gearbox is provided for a gas turbine engine including an engine shaft and gear assembly, the gear assembly including an accessory gearbox having an AGB output, the gear assembly defining a first overall gear ratio between the engine shaft and the AGB output. The phasing gearbox includes a PGB input shaft configured for coupling to, or rotation with, the AGB output; a PGB output; and a plurality of PGB gear sets positioned between the PGB input shaft and the PGB output, the plurality of PGB gear sets defining a second overall gear ratio, the second overall gear ratio being an inverse of the first overall gear ratio.

In certain exemplary embodiments the first overall gear ratio is an irrational number, and wherein the second overall gear ratio is an exact inverse of the first overall gear ratio.

In certain exemplary embodiments each gear set of the plurality of gear sets of the phasing gearbox defines a PGB gear ratio that is an inverse of a GA gear ratio of one GA gear set.

In certain exemplary embodiments the plurality of PGB gear sets includes a first PGB gear set and a second PGB gear set, wherein the first PGB gear set defines a first PGB gear ratio that is an inverse of a first GA gear ratio of a first GA gear set, and wherein the second PGB gear set defines a second PGB gear ratio that is an inverse of a second GA gear ratio of a second GA gear set.

In certain exemplary embodiments the PGB output of the phasing gearbox includes a PGB output shaft and a circular member, wherein the circular member including a plurality of position indicators spaced circumferentially on the circular member.

In certain exemplary embodiments the phasing gearbox further includes a casing; and an end cover panel, wherein the end cover panel defines an opening for viewing a position of the PGB output.

In certain exemplary embodiments the phasing gearbox further includes a casing; and an end cover panel, wherein the end cover panel includes an inclinometer and temperature sensing device.

In certain exemplary embodiments the PGB output of the phasing gearbox includes a PGB output shaft and a circular member, the phasing gearbox further including: a casing; and an end cover panel, wherein the end cover panel includes an airflow screen, and wherein the circular member of the PGB output includes a plurality of airflow members spaced circumferentially on the circular member for inducing a flow of cooling air through the airflow screen of the end cover panel during operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
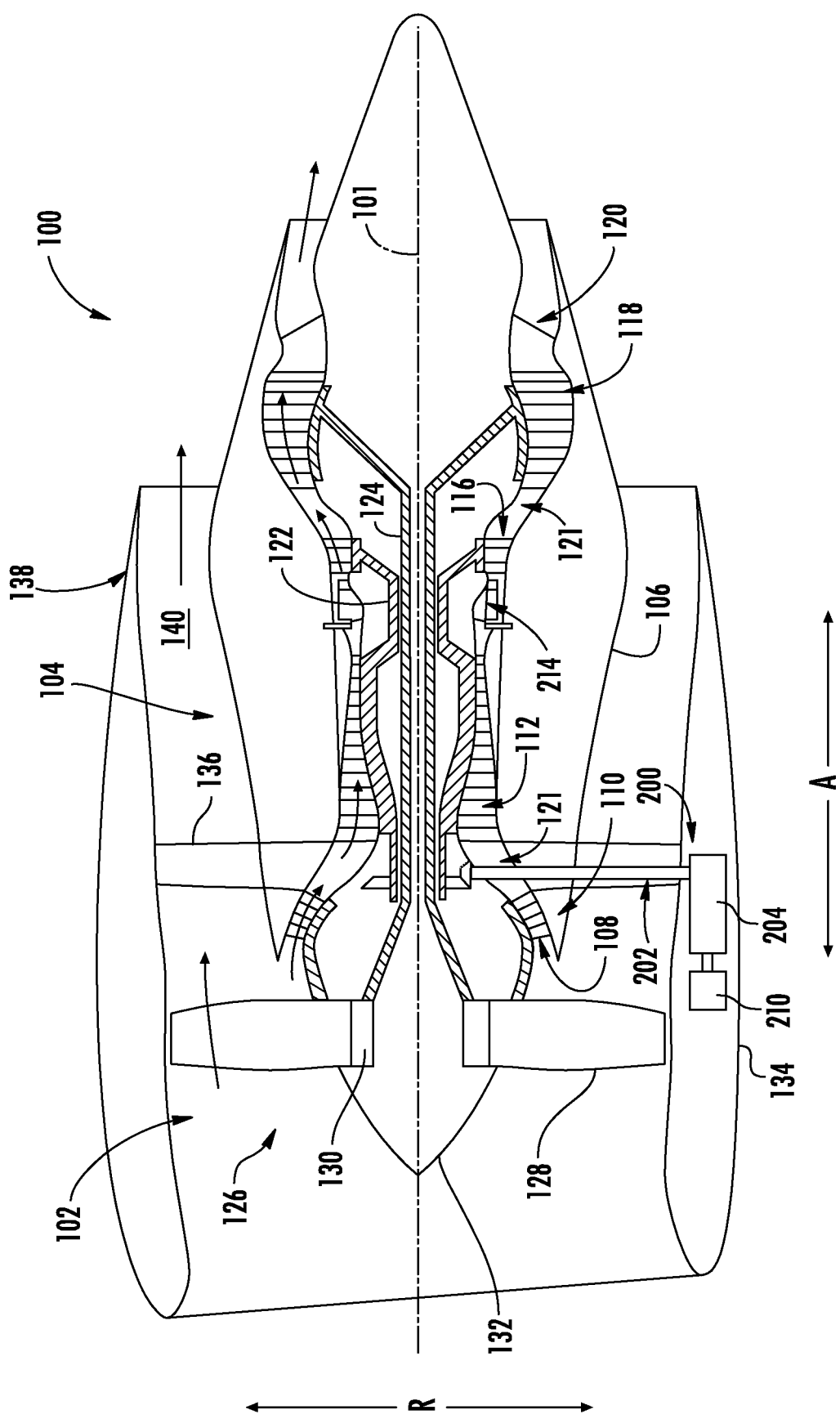
FIG. 1 is a schematic view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine mounted on, or incorporated into, an aircraft. Alternatively, however, the engine may be any other suitable type of engine for any other suitable vehicle, or for any other purpose (such as, e.g., power generation, land-vehicle propulsion, fluid pumping stations, etc.).

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a core jet exhaust nozzle section 120. The compressor section, combustion section 114, and turbine section together define at least in part a core air flowpath 121 extending from the annular inlet 108 to the jet nozzle exhaust section 120. The turbofan engine further includes one or more axial drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub spinner 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define an annular fan bypass airflow passage 140 therebetween.

Referring still to FIG. 1, the turbofan engine 100 additionally includes a gear assembly 200 including a driveshaft 202 and an accessory gearbox 204. For the embodiment shown, the accessory gearbox 204 is located outside of the core air flowpath 121 defined in part by the compressors (i.e., compressors 110, 112) of the compressor section and the turbines (i.e., turbines 116, 118) of the turbine section, in and under-cowl area defined between the outer casing 106 and the core air flowpath 121 of the turbomachine 104.

The gear assembly 200 further includes a first gear assembly ("GA") gear set 206 mating the driveshaft 202 of the gear assembly to the HP shaft 122 of the turbomachine 104. As will be explained in more detail below, the first GA gear set 206 generally includes a pair of bevel gears, with one coupled to the HP shaft 122 and the other coupled to the driveshaft 202, such that the HP shaft 122 rotates the driveshaft 202 about a local axis of the driveshaft 202. Additionally, it will be appreciated that for the embodiment shown, the driveshaft 202 is a radial driveshaft extending generally along the radial direction R. As such, the local axis of the driveshaft 202 is, for the embodiment shown, parallel to the radial direction R.

For the embodiment shown, the driveshaft 202 extends generally from the HP shaft 122, through the core air flowpath 121, and to the accessory gearbox 204, driving/rotating the accessory gearbox 204. In such a manner, it will be appreciated that the accessory gearbox 204 is coupled to and driven by the HP shaft 122 of the turbomachine 104. Moreover, as will be discussed in more detail below, the turbomachine 100 further includes a phasing gearbox 210 coupled to the accessory gearbox 204 via, e.g., an accessory mounting pad of the accessory gearbox 204. As will be appreciated from the description below, the phasing gearbox 210 may convey information regarding an engine spool (or more particularly of the HP shaft 122 for the embodiment depicted) to allow for the balancing of the engine spool without substantial disassembly of the turbofan engine 100, or in certain embodiments, without any disassembly of the turbofan engine 100.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a marine gas turbine engine, etc.

Figure 2:
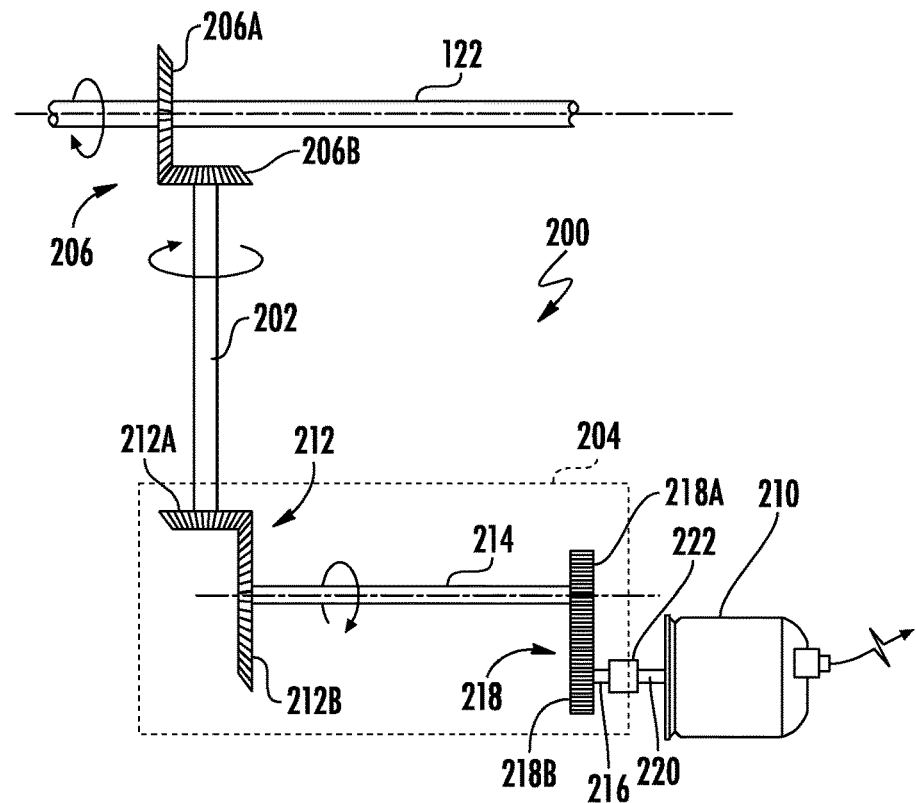
FIG. 2 is a schematic view of a gear assembly and a phasing gearbox coupled to an engine shaft in accordance with an exemplary embodiment of the present disclosure.

Referring now to FIG. 2, a schematic view is provided of the gear assembly 200 and phasing gearbox 210, interacting with an engine shaft mechanically coupled to a compressor and a turbine of a gas turbine engine. More specifically, the gear assembly 200 and phasing gearbox 210 are the gear assembly 200 and phasing gearbox 210 of FIG. 1, such that the engine shaft depicted is the HP shaft 122 (coupled to the HP compressor 112 and HP turbine 116 of the turbofan engine 100, see FIG. 1).

As noted above, the gear assembly 200 includes the driveshaft 202 and the accessory gearbox 204. In addition, it will be appreciated that the gear assembly 200 includes a plurality of GA gear sets. The plurality of GA gear sets includes the first GA gear set 206 mating the driveshaft 202 of the gear assembly 200 to the HP shaft 122, and a second GA gear set 212 mating the driveshaft 202 to the accessory gearbox 204. More particularly, it will be appreciated that the accessory gearbox 204 includes an internal shaft 214 and an accessory gearbox ("AGB") output 216, also referred to as an AGB accessory drive pad. Notably, although a single internal shaft 214 is depicted in FIG. 2, in other embodiments, the accessory gearbox 204 may include a plurality of internal shafts 214.

The second GA gear set 212 accordingly mates the driveshaft 202 to the internal spool 214 of the accessory gearbox 204, and plurality of GA gear sets of the gear assembly 200 further includes a third GA gear set 218 mating the internal shaft 214 of the accessory gearbox 204 to the AGB output 216 of the accessory gearbox 204. Briefly, it will further be appreciated that the phasing gearbox 210 includes a phasing gearbox ("PGB") input shaft 220. The AGB output 216 and PGB input shaft 220 are each generally configured as (or include) shafts, and the PGB input shaft 220 is coupled to the AGB output 216 through a splined connection 222, for the embodiment shown to facilitate easy installation and removal. However, in other embodiments, the PGB input shaft 220 may be coupled to the AGB output 216 in any other suitable manner.

Notably, although the accessory gearbox 204 is depicted schematically as only including a single output (i.e., output 216), in most configurations, the accessory gearbox 204 will include a plurality of outputs (which as noted above are sometimes also referred to as AGB accessory drive pads) for coupling/driving various accessory systems of the gas turbine engine including the accessory gearbox 204. For example, the accessory gearbox 204, in other embodiments may include one or more outputs (or drive pads) for coupling to/driving a lubrication oil system, a fuel pump, a variable frequency starter motor/generator, a hydraulic system, etc. Moreover, it will be appreciated that following the balancing of the engine shaft, the phasing gearbox 210 may be removed (i.e., the PGB input shaft 220 decoupled from the AGB output 216), and the AGB output 216 may then be fitted with one or more of these accessory systems, such as the variable frequency starter motor/generator.

Referring still to FIG. 2, it will be appreciated that the gear assembly 200 defines a first overall gear ratio between the engine shaft/HP shaft 122 and the AGB output 216 of the accessory gearbox 204. More specifically, for the embodiment shown, the first GA gear set 206 defines a first GA gear ratio, the second GA gear set 212 defines a second GA gear ratio, and the third GA gear set 218 defines a third GA gear ratio. More specifically, still, each of the first, second, and third GA gear sets 206, 212, 218 includes a first gear 206A, 212A, 218A and a second gear 206B, 212B, 218B, respectively. The gear ratio of each gear set may generally be a ratio of a number of teeth on the first gear to a number of teeth on the second gear. For example, the first GA gear ratio is a ratio of a number of teeth on the first gear 206A to a number of teeth on the second gear 206B. The first overall gear ratio is, for the embodiment shown, equal to the first GA gear ratio times the second GA gear ratio times the third GA gear ratio.

In order to reduce a likelihood of a resonance frequency being generated during operation of the gas turbine engine including the gear assembly 200, one or more of the first, second, and third GA gear ratios may generally be an irrational number. For example, each of the first, second, and third GA gear ratios may be an irrational number. As such, the first overall gear ratio may also be an irrational number. It will be appreciated, however, that in other embodiments, the first, second and/or third GA gear ratios may not be an irrational number.

As mentioned above, the phasing gearbox 210 is generally configured to indicate certain information regarding the HP shaft 122 (e.g., a position and/or an angular velocity) without requiring substantial disassembly of the gas turbine engine, or without require any disassembly of the gas turbine engine. More specifically, referring now also to FIG. 3, providing a schematic view of the internal components of the exemplary phasing gearbox 210 of FIG. 2, it will be appreciated that the phasing gearbox 210 further includes a PGB output 224, with the phasing gearbox 210 defining a second overall gear ratio between the PGB input shaft 220 (which rotates in a 1:1 relationship with the AGB output 216 by virtue of the splined connection 222) and the PGB output 224. The second overall gear ratio is an inverse of the first overall gear ratio. In such a manner, the PGB output 224 rotates in a precise 1:1 relationship (e.g., at the same rotational speed) with the HP shaft 122. Briefly, it will be appreciated that the PGB output 224 generally includes a PGB output shaft 225 and a circular member 236 (described further below).

For example, for the embodiment depicted, the phasing gearbox 210 includes a plurality of PGB gear sets. Each PGB gear set of the plurality of PGB gear sets of the phasing gearbox 210 defines a PGB gear ratio that is an inverse of a GA gear ratio of one GA gear set of the plurality of GA gear sets of the gear assembly 200. For example, as noted above, the gear assembly 200 includes the first, second, and third GA gear sets 206, 212, 218. The phasing gearbox 210 similarly includes a first PGB gear set 226, a second PGB gear set 228, and a third PGB gear set 230. The first PGB gear set 226 defines a first PGB gear ratio, the second PGB gear set 228 defines a second PGB gear ratio, and the third PGB gear set 230 defines a third PGB gear ratio. The first PGB gear ratio is an inverse of the first GA gear ratio, the second PGB gear ratio is an inverse of the second GA gear ratio, and the third PGB gear ratio is an inverse of the third GA gear ratio.

As with the plurality of GA gear sets, each of the plurality of PGB gear sets 226, 228, 230 generally includes a first gear 226A, 228A, 230A and a second gear 226B, 228B, 230B, respectively. The first PGB gear ratio is equal to a ratio of the number of teeth on the first gear 226A of the first PGB gear set 226 to the number of teeth on the second gear 226B of the first PGB gear set 226; the second PGB gear ratio is equal to a ratio of the number of teeth on the first gear 228A of the second PGB gear set 228 to the number of teeth on the second gear 228B of the second PGB gear set 228; and the third PGB gear ratio is equal to a ratio of the number of teeth on the first gear 230A of the third PGB gear set 230 to the number of teeth on the second gear 230B of the third PGB gear set 230.

The PGB gear ratios of the first, second, and third PGB gear sets 226, 228, 230 may each be an exact inverse of a GA gear ratio of an individual one of the first, second, and third GA gear sets 206, 212, 218. For example, in certain embodiments, the first PGB gear ratio may be an exact inverse of the first GA gear ratio, the second PGB gear ratio may be an exact inverse of the second GA gear ratio, and the third PGB gear ratio may be an exact inverse of the third GA gear ratio. More specifically, for example, the first gear 226A of the first PGB gear set 226 may include the same number of teeth as the second gear 206B of the first GA gear set 206, and further, the second gear 226B of the first PGB gear set 226 may include the same number of teeth at the first gear 206A of the first GA gear set 206. The second PGB gear set 228 and second GA gear set 212 may be configured in a similar manner, and further, the third PGB gear set 230 third GA gear set 218 may also be configured in a similar manner. As such, it will be appreciated that the second overall gear ratio may be an exact inverse of the first gear ratio. Moreover, it will be appreciated that for certain embodiments, such as the embodiment depicted, the inverse ratios may be provided simply by reversing a number of teeth on a driving gear with a number of teeth on a driven gear, and vice versa.

Figure 3:
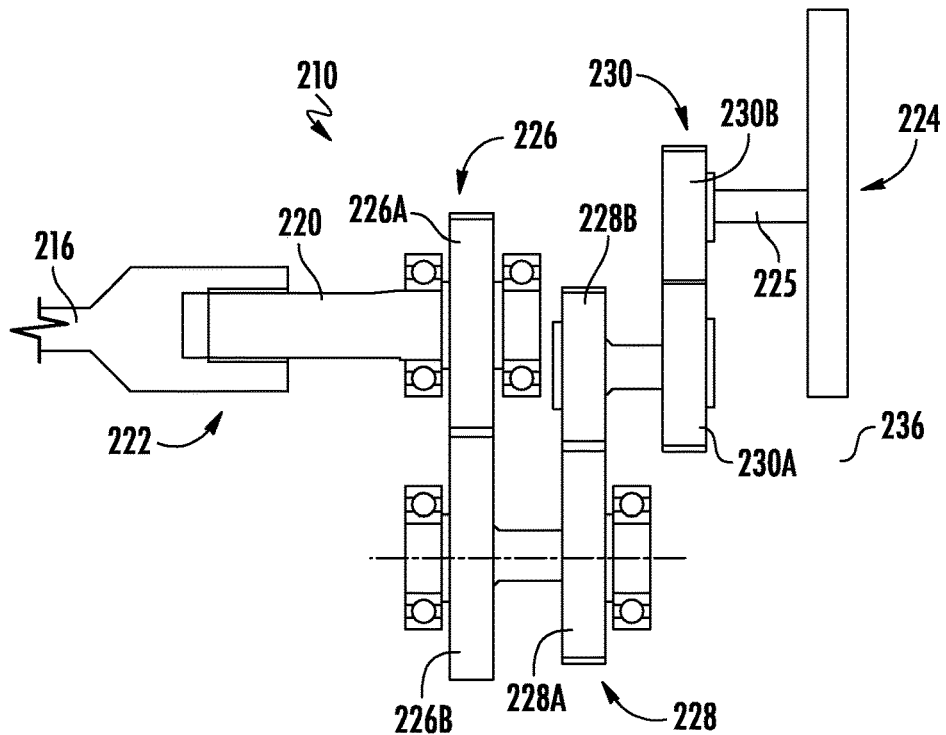
FIG. 3 is a schematic view of a plurality of PGB gear sets of the exemplary phasing gearbox of FIG. 2.

Briefly, it will further be appreciated that first gear 206A of the first GA gear set 206 is coupled to and rotatable with the engine shaft/HP shaft 122 (see FIG. 2); the AGB output 216 is coupled to, and rotatable with, the second gear 218B of the third GA gear set 218 (see FIG. 2); the PGB input shaft 220 is coupled to, and rotatable with, the first gear 226A of the first PGB gear set 226 (see FIG. 3); and the PGB output 224 is coupled to, and rotatable with, the second gear 230B of the third PGB gear set 230 (see FIG. 3). Therefore, it will be appreciated that the PGB output 224 is configured to rotate at precisely the same speed as the engine shaft/HP shaft 122, such that a position of the HP shaft 122 and rotational speed of the HP shaft 122 may be determined by measuring the same on the PGB output 224, such as on the circular member 236 of the PGB output 224.

Figure 4:
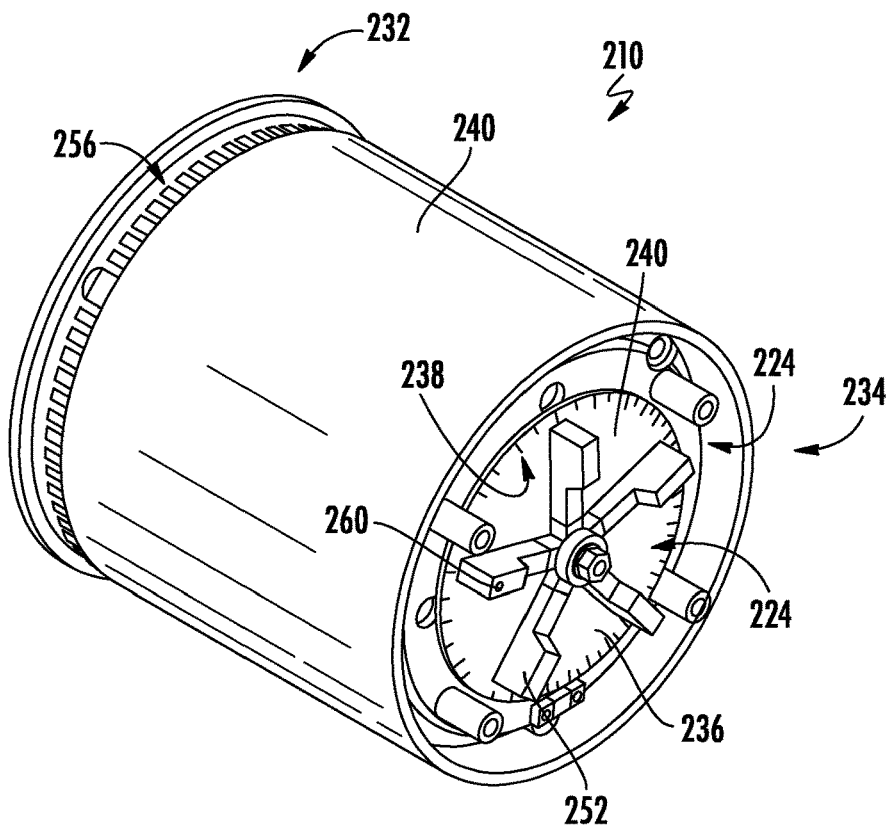
FIG. 4 is a perspective view of a phasing gearbox in accordance with an exemplary embodiment of the present disclosure without an end cover panel installed.
Figure 5:
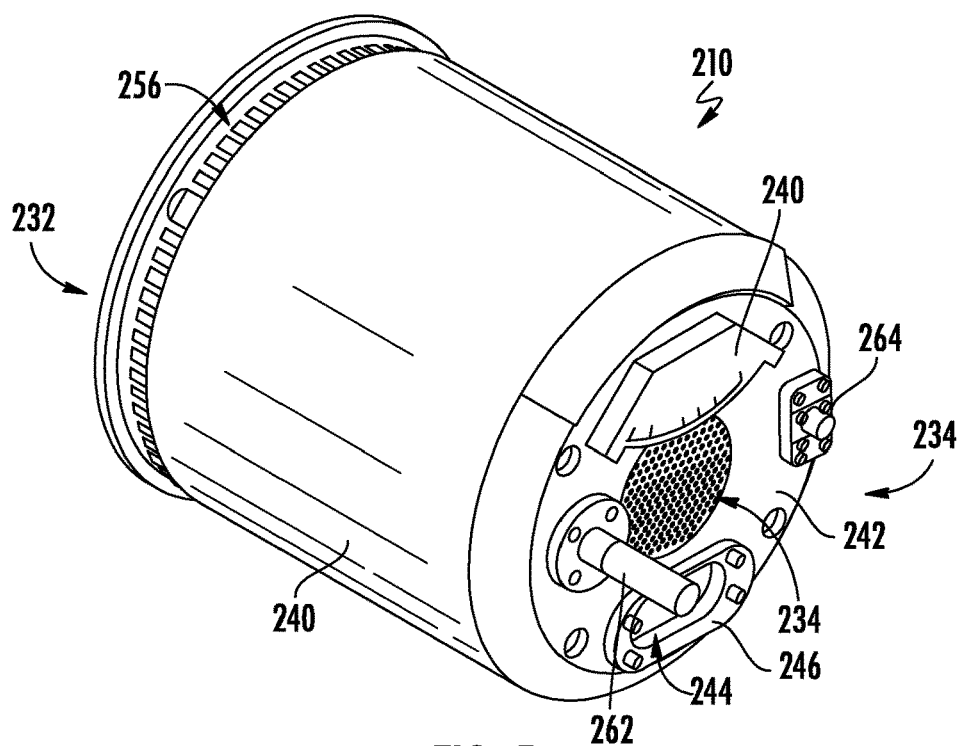
FIG. 5 is a perspective view of the exemplary phasing gearbox of FIG. 4 including the end cover panel.

Referring now to FIGS. 4 and 5, perspective views of the exemplary phasing gearbox 210 described above with reference to FIGS. 1 through 3 are provided. FIG. 4 provides a perspective view of the exemplary phasing gearbox 210 showing the PGB output 224 of the phasing gearbox 210, and FIG. 5 provides a perspective view of the exemplary phasing gearbox 210 with an end cover panel 242 coupled thereto.

As will be appreciated, the phasing gearbox 210 generally extends between a first end 232 and a second end 234, with the PGB input shaft 220 located at the first end 232 (not shown) and the PGB output 224 located at the second end 234 (see FIG. 4). As briefly noted above, for the embodiment shown the PGB output 224 includes the circular member 236 coupled to the PGB output shaft 225 and configured to rotate at the same rotational speed at the second gear 230B of the third PGB gear set 230. The circular member 236 (indexing indicator and fan wheel) includes a plurality of position indicators 238 spaced circumferentially on the circular member 236. The position indicators 238 may be, e.g., degree indications ranging between 0 degrees and 360 degrees at desired intervals (e.g., fifteen degree intervals). As will be appreciated, the circular member 236, by virtue of being rotatable with the second gear 230B of the third PGB gear set 230, rotates in precisely the same speed (and azimuth position) as the HP shaft 122, such that determining a position of the circular member 236 may allow a user to determine a position of the HP shaft 122.

Referring particularly to FIG. 5, it will be appreciated that the phasing gearbox 210 further includes a casing 240 encircling/enclosing the plurality of PGB gear sets, with the end cover panel 242 coupled thereto at the second end 234. For the embodiment shown, the end cover panel 242 includes an opening 244 with a transparent window 246 covering the opening 244 allowing a user to view the PGB output 224. As such, the user may determine the position of the engine shaft by viewing the PGB output 224 through the opening 244 in the end cover panel 242. The transparent window 246 over the opening 244 may include a vertical line or other indicia scribed thereon to permit accurate reading of the position indicators 238 immediately inside.

As is also depicted, the end cover panel 242 includes an inclinometer 248. In order to positionally "zero" the PGB on the AGB 204 drive pad, it may be necessary to rotationally adjust the PGB prior to tightening its attachment clamp. The internal lubricating sump can accommodate some amount of "non-horizontal" mounting. In at least certain exemplary embodiments, the plurality of PGB gear sets may be positioned within a cavity (not shown) of the phasing gearbox 210, inward of the outer casing 240, and at least partially submerged in a lubricating oil. The inclinometer 248 may ensure that the phasing gearbox 210 is rotationally mounted in a manner to ensure the plurality of PGB gear sets are sufficiently lubricated during operation.

Figure 6:
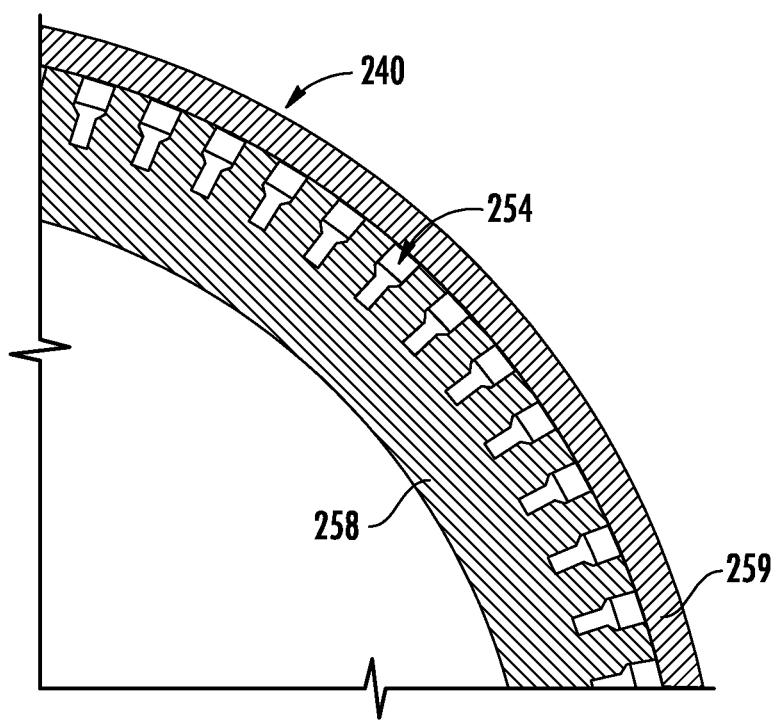
FIG. 6 is a close-up, cross-sectional view of several axial airflow cooling channels of the exemplary phasing gearbox of FIG. 4, located around a periphery of the exemplary phasing gearbox.

Further, for the embodiment shown, the end cover panel 242 includes an airflow screen 250 for allowing a flow of cooling air therethrough. More specifically, referring back briefly to FIG. 4, it will be appreciated that the circular member 225 of the PGB output 224 further includes a plurality of airflow members 252 spaced along the circumferential thereon and extending along the radial direction. The plurality of airflow members 252 are more specifically configured as airflow blades for generating a cooling airflow through the airflow screen 250 and radially outward during operation. The airflow may flow radially outward along the circular member of the PGB output 224, and through a plurality of airflow channels 254 extending generally along the axial direction (FIG. 4) located inward of the outer casing 240. The outer casing 240 further defines an exhaust 256 for the annular airflow channel 254 at the first end 232 of the phasing gearbox 210. Referring to FIG. 6, providing a close-up, cross-sectional view of the plurality of axial airflow channels 254, it will be appreciated that for the embodiment shown, the outer casing 240 includes a gearbox case 258 and a housing 259. In one embodiment, the gearbox case 258 may be formed, e.g., by casting or using any other suitable formation method. Subsequently, channels may be formed in an outer surface of the gearbox case 258 and the housing 259 may be fitted over the outer surface of the gearbox case 258 to form the channels 254. The plurality of axial airflow channels may further reduce an internal temperature of the phasing gearbox 210 and lubrication oil during operation. As will be appreciated, in other embodiments the channels 254 may be formed in any other suitable manner, may extend in any suitable direction, and may be configured in any other suitable manner (e.g., may be a small number of channels together forming an annular flowpath).

Further, still, referring back to FIGS. 4 and 5, it will be appreciated that the phasing gearbox 210 further includes a sensor for sensing rotational information about the PGB output 224, such as an angular velocity of the PGB output 224. More specifically, the circular member 225 of the PGB output 224 (and more specifically, still, one airflow member 252) includes a ferrous target 260, and the cover pane 242 includes a magnetic sensor 262 (such as a Hall effect sensor) for sensing the ferrous target 260 and thus determining the once per revolution rotational positional information about the PGB output 224 (and by extension the HP shaft 122). Notably, the exemplary end cover panel 242 further includes a communication network output 264 operably coupled to the sensor 262 for communicating the sensed information to, e.g., a controller or other computing device. Further, a thermocouple is installed in the bottom of the gearbox case 258 cavity, and connected to external sensing hardware, in order to provide a real-time indication of oil temperature while in operation.

It will be appreciated that by mounting the phasing gearbox 210 to the accessory gearbox 204 of the gas turbine engine, a position and angular velocity of the engine shaft of the gas turbine engine may be determined without any substantial disassembly of the engine. Specifically, all that is required is for an accessory system of the gas turbine engine, such as a generator, coupled to the accessory gearbox 204, to be switched out with the phasing gearbox 210. Such may allow for balancing of the engine shaft to determine whether or not the engine shaft meets certain design specification limitations, e.g., after initial assembly of the gas turbine engine, with minimum setup required.

Briefly, it should be appreciated that the exemplary phasing gearbox 210 depicted is by way of example only. In other embodiments, the phasing gearbox 210 may have any other suitable configuration. For example, in other embodiments, the gear assembly 200 may have any other suitable number of GA gear sets, and the phasing gearbox 210 may have any suitable gearing configuration to define an inverse overall gear ratio than an overall gear ratio of the plurality of GA gear sets. For example, the phasing gearbox 210 may include the same number of PGB gear sets as the number of GA gear sets. Alternatively, the phasing gearbox 210 may have any other gearing arrangement. Further, the phasing gearbox 210 may have any other suitable PGB output configuration, end cover panel design, coupling system for coupling to the accessory gearbox 204, may not include all the features depicted, may include additional features not depicted, etc. Further, in other embodiments the phasing gearbox 210 may be coupled to any suitable drive pad of the accessory gearbox.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a compressor, a turbine, and an engine shaft coupled to the compressor and the turbine;
a gear assembly comprising a driveshaft and an accessory gearbox, the driveshaft rotatable by the engine shaft and the accessory gearbox (AGB) rotatable by the driveshaft, the accessory gearbox including an output of the AGB, and the gear assembly defining a first overall gear ratio between the engine shaft and the AGB output; and
a phasing gearbox (PGB) coupled to the accessory gearbox and comprising an output of the PGB, and the phasing gearbox defining a second overall gear ratio between the output of the AGB of the accessory gearbox and the output of the PGB, wherein the second overall gear ratio is an inverse of the first overall gear ratio.

2. The gas turbine engine of claim 1, wherein the first overall gear ratio is an irrational number, and wherein the second overall gear ratio is an exact inverse of the first overall gear ratio.

3. The gas turbine engine of claim 1, wherein the gear assembly (GA) includes a plurality of GA gear sets, wherein the phasing gearbox comprises a plurality of PGB gear sets, and wherein each PGB gear set defines a PGB gear ratio that is an inverse of a GA gear ratio of one GA gear set of the plurality of GA gear sets of the gear assembly.

4. The gas turbine engine of claim 1, wherein the gear assembly includes a first GA gear set and a second GA gear set, wherein the phasing gearbox comprises a first PGB gear set and a second PGB gear set, wherein the first PGB gear set defines a first PGB gear ratio that is an inverse of a first GA gear ratio of the first GA gear set, and wherein the second PGB gear set defines a second PGB gear ratio that is an inverse of a second GA gear ratio of the second GA gear set.

5. The gas turbine engine of claim 1, wherein the accessory gearbox comprises an internal spool, wherein the gear assembly includes a first GA gear set mating the driveshaft to the engine shaft, a second GA gear set mating the driveshaft to the internal spool, and a third GA gear set mating the internal spool to the output of the AGB.

6. The gas turbine engine of claim 5, wherein the phasing gearbox comprises a first PGB gear set, a second PGB gear set, and a third PGB gear set, wherein the first PGB gear set defines a first PGB gear ratio that is an inverse of a first GA gear ratio of the first GA gear set, wherein the second PGB gear set defines a second PGB gear ratio that is an inverse of a second GA gear ratio of the second GA gear set, and wherein the third PGB gear set defines a third PGB gear ratio that is an inverse of a third GA gear ratio of the third GA gear set.

7. The gas turbine engine of claim 1, wherein the output of the PGB of the phasing gearbox comprises a PGB output shaft and a circular member comprising a plurality of position indicators spaced circumferentially on the circular member.

8. The gas turbine engine of claim 1, wherein the phasing gearbox comprises a casing and an end cover panel, and wherein the end cover panel defines an opening for viewing the output of the PGB.

9. The gas turbine engine of claim 1, wherein the phasing gearbox comprises a casing and an end cover panel, and wherein the end cover panel comprises an inclinometer.

10. The gas turbine engine of claim 1, wherein the phasing gearbox comprises a casing and an end cover panel, and wherein the end cover panel comprises an airflow screen for allowing a flow of cooling air therethrough.

11. The gas turbine engine of claim 10, wherein the output of the PGB of the phasing gearbox comprises a PGB output shaft and a circular member, the circular member comprising a plurality of blades spaced circumferentially on the circular member for inducing the flow of cooling air through the airflow screen of the end cover panel during operation.

12. The gas turbine engine of claim 1, wherein the compressor and the turbine define in part a core air flowpath, and wherein the accessory gearbox is located outward of the core air flowpath.

13. A phasing gearbox (PGB) for a gas turbine engine comprising an engine shaft and gear assembly (GA), the gear assembly comprising an accessory gearbox (AGB) having an output of the AGB, the gear assembly defining a first overall gear ratio between the engine shaft and the output of the AGB, the phasing gearbox comprising:
a PGB input shaft configured for coupling to, or rotation with, the AGB output;
an output of the PGB; and
a plurality of PGB gear sets positioned between the PGB input shaft and the output of the PGB, the plurality of PGB gear sets defining a second overall gear ratio, the second overall gear ratio being an inverse of the first overall gear ratio.

14. The phasing gearbox of claim 13, wherein the first overall gear ratio is an irrational number, and wherein the second overall gear ratio is an exact inverse of the first overall gear ratio.

15. The phasing gearbox of claim 13, wherein each gear set of the plurality of gear sets of the phasing gearbox defines a PGB gear ratio that is an inverse of a GA gear ratio of one GA gear set.

16. The phasing gearbox of claim 13, wherein the plurality of PGB gear sets comprises a first PGB gear set and a second PGB gear set, wherein the first PGB gear set defines a first PGB gear ratio that is an inverse of a first GA gear ratio of a first GA gear set, and wherein the second PGB gear set defines a second PGB gear ratio that is an inverse of a second GA gear ratio of a second GA gear set.

17. The phasing gearbox of claim 13, wherein the output of the PGB of the phasing gearbox comprises a PGB output shaft and a circular member, wherein the circular member comprising a plurality of position indicators spaced circumferentially on the circular member.

18. The phasing gearbox of claim 13, further comprising:
a casing; and
an end cover panel, wherein the end cover panel defines an opening for viewing a position of the output of the PGB.

19. The phasing gearbox of claim 13, further comprising:
a casing; and
an end cover panel, wherein the end cover panel comprises an inclinometer and temperature sensing device.

20. The phasing gearbox of claim 13, wherein the output of the PGB of the phasing gearbox comprises a PGB output shaft and a circular member, and wherein the phasing gearbox further comprises:
a casing; and
an end cover panel, wherein the end cover panel comprises an airflow screen, and wherein the circular member of the output of the PGB comprises a plurality of airflow members spaced circumferentially on the circular member for inducing a flow of cooling air through the airflow screen of the end cover panel during operation.

* * * * *